United States Patent Office 3,708,309
Patented Jan. 2, 1973

3,708,309
CAKE MIX
George E. Johnson, Minneapolis, Minn., and Penelope C. Rohleder, Aspen, Colo., assignors to General Mills, Inc.
No Drawing. Filed Apr. 7, 1971, Ser. No. 132,223
Int. Cl. A23l 1/10
U.S. Cl. 99—94
5 Claims

ABSTRACT OF THE DISCLOSURE

Hand mixable cake mixes made with agglomerated all purpose wheat flour. These mixes have outstanding shelf stability and produce cakes having home made style textures.

---

This invention relates to dry cake mixes which produce cakes having dense, open textures and a smooth, rich, moist eating quality. More particularly, the dry cake mixes of this invention: are capable of rapid rehydration and hand mixing; produce cake textures having randomly distributed small and large air cells contained within thick, moist cell walls; and have exceptional storage properties. Furthermore, these cake mixes do not require the incorporation of eggs either in the mix or during preparation to produce cakes having the above texture and storage qualities.

Soft wheat flour, commonly called cake flour, is frequently used to make cakes from "scratch" recipes. The cake texture obtained from using soft wheat flour is light, fluffy and of even, fine grain. More often, however, all purpose wheat flour, normally containing from about 9.5% to 11.0% protein by weight, is used to make cakes from "scratch." Such cakes are made using eggs and considerable mixing of ingredients. Cakes made with all purpose wheat flour are coarser, more open grained, more non-uniform in grain, more moist and have a richer eating quality than cakes made from soft wheat flour. It is this type of texture which is generally associated with the home-made "scratch" cake. To a limited extent, agglomerated all purpose wheat flour has been used in making cakes from "scratch" using the same methods as used for non-agglomerated all purpose wheat flour. The texture obtained by using agglomerated all purpose wheat flour in "scratch" recipes is practically indistinguishable from that obtained by using all purpose flour which has not been agglomerated.

The use of prepared mixes for baking cakes has received wide usage, particularly in home baking. Prepared cake mixes contain at least flour, shortening and sugar. In mixes for layer cakes, the proportions are usually about 35% to 45% flour by weight of the mix, about 1% to 16% and preferably about 8% to 16% shortening by weight of the mix and about 30% to 56% sugar by weight of the mix. The flour used in these cake mixes has been traditionally soft wheat flour. All purpose wheat flour is not usually used in prepared cake mixes due to its lack of tolerance to manufacturing conditions. The shortening used is normally of a plastic nature and is smeared onto the other ingredients. Other selected ingredients such as leavening agents, flavorings and stabilizers may be included depending upon the particular cake to be produced. Some mixes include dry eggs while others are designed so that these ingredients are added fresh at the time the cake is to be baked.

Preparing a cake from a conventional dry cake mix is a well-known procedure of rehydrating the mix and baking the resulting batter at an elevated temperature. The conventional cake mix requires mechanical or prolonged and difficult hand mixing to convert it and the liquid ingredients into a cake batter. The texture of the cakes produced by the conventional cake mix has been traditionally fluffy, light and of fine, even grain. The air cells have been small, numerous and generally uniformly distributed throughout the interior of the cake. Normally the moisture level of cakes made from conventional cake mixes is about 35% to 37% by weight of the baked composition.

While plastic shortening is normally used in cake mixes, cake mixes using liquid shortening, an emulsifier, a polygalactomannan and soft wheat flour are disclosed in U.S. Pat. No. 3,161,524. These cake mixes are hand mixable. Abandoned patent application Ser. No. 220,866 copending with U.S. Pat. No. 3,161,524 and referred to in U.S. Pat. No. 3,161,524 discloses a hand mixable culinary mix composed of soft wheat flour, sugar, leavening agents, liquid shortening and an emulsifier.

The cake mixes of the present invention include agglomerated all purpose wheat flour, sugar, a liquid shortening, a dried shortening adsorbed on a solid, particulate carrier and a leavening system. Unlike "scratch" cake preparation and preparation from conventional cake mixes, eggs need not be included. The mixes are easily converted to cake batters by hand mixing with a fork. The time required for hand mixing to convert these cake mixes into batters is only about one third of the time required by cake mixes containing liquid shortening and other flours. The baked cakes made with these mixes have a texture comparable to the texture of home made "scratch" cake made with all purpose flour and completely different from the texture of cakes obtained from conventional cake mixes made with soft wheat flour. The density of the cakes is from about 33% to 50% greater than cakes made from conventional cake mixes. The texture includes a cake crust which is sugary, crisp and smooth, and broken only by small air bubbles. The interior texture of the cake is coarse and composed of large and small air cells randomly distributed throughout the interior and encompassed by thick, dense, moist cell walls having a moisture content of from about 38% to 40% by weight of the baked cake. The moisture in the cake is fully integrated into the structure. The eating quality of these cakes is smooth, rich and moist. In addition to being hand mixable and producing cakes having a home-made texture, the cake mixes of this invention have outstanding keeping qualities and have been stored for periods as long as a year with no significant changes in the final baked cake occurring.

The cake mixes of this invention comprise:

about 35% to 45% agglomerated all purpose flour by weight of the mix,
about 1% to 16% shortening component by weight of the mix, said shortening component comprising from about 25% to 75% liquid shortening by weight and 25% to 75% shortening which is dried and adhered to a solid particulate carrier,
about 30% to 60% sucrose by weight of the mix, and
about 0.5% to 10% chemical leavening agent by weight of the mix.

Other selected ingredients such as flavoring, nuts, and fruits can be added as desired.

All purpose wheat flour used in this invention can be agglomerated by moistening flour particles with water, in the form of steam or droplets, causing the moisture particles to contact each other, and drying the fragile, moist agglomerates.

One method of moistening the flour particles with water is disclosed in U.S. Pat. 3,245,663 and involves agglomerating apparatus comprising a vertically oriented cylindrical casing having an inlet for admitting material thereinto at its upper end and an unobstructed opening at its lower end for discharging material therefrom. An elongate cantilevered shaft is rotatably mounted adjacent the upper portion of the casing so that its cantilevered end projects into the casing toward the bottom end. A plurality of radially extending beaters, having flattened blade portions, are adjustably secured to the shaft in such a manner than they can be rotated about their longitudinal axis, so as to change the blade angle of each beater. Each beater can be adjusted so that its blade portion defines a predetermined angle with respect to a vertical plane, or in the alternative, a horizontal plane. One or more nozzles are provided for admitting a fluid medium into the casing. As the shaft is caused to rotate about its longitudinal axis, the beaters admix the material admitted at the upper end of the casing with the fluid medium, thereby forming agglomerates or aggregates which are discharged from the bottom end of the casing.

Another method of moistening and agglomerating apparatus and process, disclosed in U.S. Pat. 3,463,098 includes a vertically oriented agglomerating chamber into which a pulverulent or powdery material such as flour is introduced. The flour particles are admitted into the top of the chamber in such a manner that optimum distribution of the particles is achieved; that is accomplished by distributing the particles substantially uniformly over the entire cross-sectional area of the chamber. At least one nozzle is provided for admitting a finely dispersed or atomized spray of water into the chamber in such a manner that optimum distribution of the water droplets is also achieved, and the entire cross-sectional area of the chamber is subjected to the spray. The pressurized water droplets collide with the flour particles and create a turbulent zone or environment within the chamber in which the flour particles and water droplets are intimately mixed. As a result, the flour particles are at least partially covered with water, and the particles contact each other and agglomerate to form loosely-bounded clusters. Agglomerate quality improves as the water spray becomes finer, the wet agglomerate moisture decreases, and the distribution of flour and water improves.

One method of drying flour agglomerates, disclosed in U.S. Pat. 3,262,213, includes feeding the agglomerates to a drying zone wherein air or gas moves uninterruptedly and vertically downward throughout the entire drying zone, introducing the agglomerates into a drying gas or air stream entering the top of the drying zone, co-current passing the drying gas and agglomerates downward through the drying zone, and recovering dried agglomerates from the drying zone.

Another apparatus and process for drying agglomerates, disclosed in U.S. Pat. 3,383,774, includes a vertical cylindrically-shaped chamber having an inlet at its upper end for admitting material thereunto, a conically-shaped settling hopper positioned proximate the lower end of the chamber, and a dust collector which surrounds at least a portion of the cylindrical wall of the chamber. The dust collector includes a plurality of filter elements positioned therein, and the interior of the dust collector communicates with the interior of the settling hopper. A gaseous medium, such as air, is directed into the upper end of the chamber by appropriate means, and the air may be either heated or cooled. As particles of material are admitted into the upper end of the chamber, they are heated or cooled by the air introduced into the chamber; and as the particles fall to the bottom of he apparatus, they are either heated or cooled, depending upon their initial temperature and the temperature of the air. The particles are discharged from the bottom of the hopper and they may then undergo further processing operations, and the air is exhausted from the apparatus through the dust collector.

Commercially available, agglomerated flour is a granular substance usually having a moisture level of from about 13.0% to 14.5% by weight. The definition and standard of identity for instantized flour states that such flour will all pass through a No. 20 mesh U.S. Standard Sieve (840 micron opening) and not more than 20% will pass through a No. 200 mesh U.S. Standard Sieve (74 micron opening). This is in contrast to the identity of all purpose flour which specifies that not less than 98% of the flour passes through a cloth having openings not larger than those in a woven wire cloth designated 210 micron (No. 70 U.S. Standard Sieve). An example of the particle size distribution of a typical nonagglomerated, all purpose wheat flour and a typical agglomerated, all purpose wheat flour is as follows:

TABLE I.—PARTICLE SIZE DISTRIBUTION IN WHEAT FLOUR

| Diameter of screen opening, microns | Accumulative percent by weight flour retained on screen | |
| --- | --- | --- |
| | Nonagglomerated flour | Agglomerated flour |
| 74 | 20 | 5 |
| 100 | 50 | 20 |
| 125 | 70 | 35 |
| 150 | 90 | 50 |
| 210 | 98 | 70 |
| 250 | 100 | 90 |
| 300 | 100 | 98 |
| 350 | 100 | 100 |

Ordinarily, agglomerated wheat flours made according to both moistening methods described above, are blended to obtain particular bulk densities and cup weights. Typical blending ratios are from about one third to one half agglomerated flour made by moistening the unagglomerated flour with a water spray as it drops through a cylinder and about two thirds to one half agglomerated flour made by moistening during mechanical mixing.

The shortening component used in the practice of this invention preferably is included in the mix in amounts of from about 8% to 16% by weight of the mix. It involves two parts: one part being a liquid shortening and the other part being a dried shortening adhered to a solid particulate carrier. The liquid shortening can be animal, vegetable or synthetic oil which is liquid at ordinary room temperatures. Representative of such liquid shortenings are coconut oil, palm kernel oil, cottonseed oil, peanut oil, olive oil, sunflower seed oil, sesame oil, corn oil, safflower oil, poppyseed oil, soybean oil, and the like. Other naturally occurring fatty oils may be used as well as oils synthesized from various natural and synthetic fatty acids. All that is necessary is that said oils be edible and liquid at temperatures below about 80° F. The liquid shortening can be used in amounts of from about 25% to 75% by weight of the shortening component and preferably in amounts of from about 40% to 60% by weight of the shortening component. The dried shortening can be liquid or plastic and of vegetable or animal origin. Commercial shortening is spray dried on a carrier such as non-fat milk solids. The carrier forms a solid, particulate vehicle to which the shortening adheres. Generally, a small amount of an emulsifier is used in spray drying to help bind the material to be dried onto the carrier. The emulsifiers are present only in very nominal amounts and while useful in the drying operation are not part of, or necessary to, the practice of the present invention. A dried shortening which has been found to be particularly suited for the cake mixes of this invention is sold under the trade name Beatreme CM by Beatrice Foods Inc. and has the formulation of 68% to 71% meat fats, 26% to 29% non-fat milk solids, 3% mono- and diglycerides of higher fatty acids, all by weight of the dried shortening composition. Another dried shortening particularly suited for the cake mixes of this invention is sold under the trade name Beatreme S by Beatrice Foods Inc. and has the formulation 68% to 71% vegetable oil, 26% to 29% non-fat dry milk, and 3% mono- and diglycerides of higher fatty acids, all by weight of the dried liquid shortening composition. The dried shortening can be used in amounts of from about 25% to 75% by weight of the shortening component and preferably in amounts of from about 40% to 60% by weight of the shortening component.

The sucrose used in dry mixes is finely ground and usually contains up to about 4% starch as an aid to maintaining its free flowing properties. Preferably, sucrose is included in the mix in amounts of from about 30% to 40% by weight of the mix.

Any of a wide variety of chemical leavening systems or compositions are available and can be used in the cake mixes of this invention. Normally, the chemical leavening system consists of a combination of an edible carbon dioxide producing salt such as edible carbonate or bicarbonate salts and an acidifier. The chemical leavening system including the acidifier and the carbonate or bicarbonate salt is generally used at a level of less than about 10% by weight based on the weight of the mix and preferably in the range of about 0.5% to 5.0% by weight. Representative acidifiers which can be used include glucono-delta-lactone, potassium bitartrate, tartaric acid, disodium phosphate, sodium aluminum sulfate, sodium aluminum phosphate, sodium acid pyrophosphate, anhydrous monocalcium phosphate, monocalcium phosphate monohydrate, acetic acid, citric acid, fumaric acid, adipic acid and the like. Mixtures of the various acidifiers can also be used. In addition, liquid acidifiers such as vinegar can be used as shown in Example I. When liquid acidifiers are used, they are added to the mix composition at the time of rehydrating the dry cake mix. Sodium bicarbonate is most often used as the edible carbonate or bicarbonate salt. Other carbonates and bicarbonates such as sodium carbonate, potassium bicarbonate and ammonium carbonate may be used. Commercially available baking powders are entirely suitable but are not normally used by the mix manufacturer. The edible carbonate or bicarbonate salt is generally used in amounts of from about 0.5% to 2.0% by weight of the cake mix composition.

The cake mixes of this invention can be made by blending the agglomerated, all purpose white flour, the sucrose, the dry shortening and the leavening agent in a ribbon blender for a period of about 8 to 20 minutes at a mix temperature below about 65° F. The liquid oil is normally added during blending by means of an oil spray or by extruding through a spreader bar. Blending is continued after introduction of the oil until the oil lump count in the mix is from 10% to 15% by weight on a No. 10 U.S. sieve. Best results are obtained when the temperature of the mix after blending is from about 65° to 70° F. The mix is subsequently finished in a standard commercial finisher. Finishers are devices for reducing shortening lump size and more intimately incorporating the shortening into a mix by impact mixing. Commercially available finishers generally include an enclosure in which are mounted rapidly rotating blades. Optional ingredients such as nuts and fruit are then blended into the mix.

The consumer can use the cake mix by merely placing the mix in the pan, adding water, mixing with a fork or spoon and finally baking. If a liquid acidifier is used such as vinegar, it is added with the water. Usually about three fourths to one and one fourth cups water are used with 15 ounces of cake mix. Best results were obtained when about 15 ounces of cake mix was mixed with about one cup of water and the mixture baked at a temperature of about 325° to 375° F. for a period of about 28 to 30 minutes at sea level pressures.

To better illustrate the preparation advantages and the unique texture qualities of the cake mix of this invention, specific examples of manufacture, preparation and storage properties are set out below.

EXAMPLE I

This example illustrates a representative manufacturing procedure and preparation method for the cake mixes of this invention. The cake mix formulation used is as follows:

|  | Percent by weight of mix |
|---|---|
| Sucrose (containing 4% by weight starch to aid free flow) | 37.00 |
| Agglomerated all-purpose wheat flour [1] | 32.05 |
| Cottonseed shortening powder on non-fat dried milk (Beatreme S, Beatrice Foods Inc.) | 10.25 |
| Corn oil | 7.50 |
| Almonds, medium cut | 6.00 |
| Cocoa, dark, dutched | 4.20 |
| Vanilla powder, imitation | 0.84 |
| Sodium bicarbonate | 0.82 |
| Fudge powder flavor, imitation | 0.73 |
| Salt | 0.61 |
|  | 100.00 |

[1] The agglomerated flour used was a mixture of flour moistened by mechanical mixing and spraying with water and flour moistened by dropping flour through a cylindrical agglomerator and spraying with water. Drying was done using a countercurrent air flow. The proportions were about two-thirds mechanically moistened and one-third merely sprayed with water while dropping through a cylinder.

The cocoa, vanilla powder, sodium bicarbonate, fudge flavor and salt were presifted through a No. 12 U.S. Standard Sieve. The sucrose, agglomerated all purpose wheat flour, cottonseed shortening powder, cocoa, vanilla powder, sodium bicarbonate, fudge powder flavor and salt were placed in a ribbon mixer and blended for ten minutes. Solid or liquid carbon dioxide were used to adjust the mix temperature to 60° F. The oil was metered into the mixture through a spreader bar with ⅛ inch holes. The extrusion continuned for a period of about two to three minutes while the ribbon blender was running. After the addition of the liquid oil, blending was continued above one to two minutes. The oil lump count in the mixer was then between 10% and 15% by weight. The lump count being taken with a No. 10 U.S. Standard Sieve. The temperature after blending was between 65° and 70° F. The mix was then finished in a finisher. The almonds were then blended into the mixture. Blending required about two minutes.

The mix was made into cakes by the following recipe. The oven was preheated to a temperature of 350° F. Fifteen ounces of the mix was placed in an ungreased 8″ x 8″ x 2″ pan. An indentation was made in the middle of the mix in the pan. One cup of water and one tablespoon of vinegar was added in this indentation. The mixture was stirred vigorously with a swirling motion for approximately one minute. The cakes were then baked for about 30 minutes.

Cakes made by this method had a moisture content of from 38% to 40% by weight. The height of the cakes was from 35 mm. to 41 mm. in an 8″ x 8″ x 2″ square pan. The texture of the cakes was coarse, composed of large and small air cells randomly distributed throughout the interior of the cake and contained by thick, dense cell walls.

EXAMPLE II

This example illustrates the storage properties of the cake mixes of this invention. Cake mixes were made according to the formulation and process set out in Example I. One series of samples was stored in cardboard boxes with glycine liner packages and a second series was stored in poly foil pouches. Both series were stored at room temperature at 100° F. and in a high humidity atmosphere in which the temperature was cycled between 70° and 90° F. After storage the samples were made into cakes using the preparation method set out in Example I. The results of the evaluation of storage samples are shown in Table II and Table III.

TABLE II.—STORAGE CARDBOARD BOX WITH GLYCINE LINER

| | Weeks storage | | | | | | | |
|---|---|---|---|---|---|---|---|---|
| | 4 | 8 | 12 | 16 | 20 | 24 | 36 | 52 |
| Storage, room temperature: | | | | | | | | |
| Specific gravity of cake | 1.04 | 1.02 | 1.06 | (¹) | (¹) | 1.06 | 1.08 | 1.08. |
| Height of cake, mm | 34.0 | 38.0 | 40.0 | (¹) | (¹) | 39.0 | 39.0 | 39.0. |
| Crust quality | Excellent | Excellent | Excellent | (¹) | (¹) | Excellent | Excellent | Excellent. |
| Grain quality | do | do | do | (¹) | (¹) | do | do | Do. |
| Storage temperature, 100° F.: | | | | | | | | |
| Specific gravity of cake | 1.08 | 1.08 | 1.12 | 1.10 | (¹) | (¹) | (¹) | (¹). |
| Height of cake | 40.0 | 39.0 | 39.0 | 39.0 | (¹) | (¹) | (¹) | (¹). |
| Crust quality | Excellent | Excellent | Good | Good | (¹) | (¹) | (¹) | (¹). |
| Grain quality | do | do | do | Excellent | (¹) | (¹) | (¹) | (¹). |
| Storage temperature, cycled 70–90° F., relative humidity 65%: | | | | | | | | |
| Specific gravity of cake | 1.05 | 1.09 | 1.11 | (²) | 1.11 | 1.07 | (¹) | (¹). |
| Height of cake, mm | 36.5 | 39.0 | 40.0 | (²) | 39.0 | 35.0 | (¹) | (¹). |
| Crust quality | Excellent | Excellent | Excellent | (²) | Good | Good | (¹) | (¹). |
| Grain quality | do | do | do | (²) | do | do | (¹) | (¹). |

¹ Sample not evaluated in this period.
² Error in measuring acidifier therefore results omitted.

TABLE III.—STORAGE POLY FOIL POUCHES

| | Weeks storage | | | | | | | |
|---|---|---|---|---|---|---|---|---|
| | 4 | 8 | 12 | 16 | 20 | 24 | 36 | 52 |
| Storage, room temperature: | | | | | | | | |
| Specific gravity of cake | 1.03 | 1.06 | 1.06 | (¹) | (¹) | 1.07 | 1.05 | 1.07. |
| Height of cake, mm | 38.0 | 38.0 | 38.0 | (¹) | (¹) | 38.0 | 40.0 | 38.0. |
| Crust quality | Excellent | Excellent | Excellent | (¹) | (¹) | Excellent | Excellent | Excellent. |
| Grain quality | do | do | do | (¹) | (¹) | do | do | Do. |
| Storage temperature, 100° F.: | | | | | | | | |
| Specific gravity of cake | 1.08 | 1.12 | 1.12 | 1.12 | (²) | (¹) | (¹) | (¹). |
| Height of cake | 36.0 | 36.0 | 41.0 | 40.0 | (²) | (¹) | (¹) | (¹). |
| Crust quality | Excellent | Excellent | Good | Excellent | (²) | (¹) | (¹) | (¹). |
| Grain quality | do | do | Excellent | do | (²) | (¹) | (¹) | (¹). |
| Storage temperature, cycled 70–90° F., relative humidity 65%: | | | | | | | | |
| Specific gravity of cake | 1.01 | 1.08 | 1.08 | 1.12 | 1.11 | 1.09 | (¹) | (¹). |
| Height of cake, mm | 40.0 | 38.0 | 41.0 | 41.0 | 38.0 | 40.0 | (¹) | (¹). |
| Crust quality | Excellent | Excellent | Good | Good | Good | Excellent | (¹) | (¹). |
| Grain quality | do | do | Excellent | Excellent | do | do | (¹) | (¹). |

¹ Sample not evaluated in this period.
² Error in measuring acidifier therefore results omitted.

All of the storage samples had excellent flavor and mouthfeel. Comparable results were obtained from cake mixes representing six additional flavor systems; namely, peanut brittle, spice filbert, coconut pecan, date walnut, banana walnut and Greek walnut.

The embodiments of the invention in which an exclusive property or privilege is claimed are defined as follows:

1. A dry layer cake mix composition consisting essentially of:
   about 35% to 45% agglomerated all purpose wheat flour by weight of the composition,
   about 1% to 16% shortening component by weight of the composition wherein 25% to 75% by weight of said shortening composition is a liquid shortening and 25% to 75% by weight is a dried shortening adhered to a solid, particulate carrier,
   about 30% to 60% sucrose by weight of the composition, and
   about 0.5% to 2.0% edible carbon dioxide producing salt by weight selected from carbonate and bicarbonate salts of the composition.

2. The composition of claim 1 wherein the shortening component is included in amounts of from about 8% to 16% by weight of the composition.

3. The composition of claim 1 wherein said shortening component includes about 40% to 60% liquid shortening by weight and 40% to 60% dried shortening adhered to a solid, particulate carrier by weight.

4. The composition of claim 1 wherein the sucrose is included in amounts of from about 30% to 40% by weight of the composition.

5. The composition of claim 1 wherein an acidifier is included.

References Cited

UNITED STATES PATENTS

| | | | |
|---|---|---|---|
| 3,116,150 | 12/1963 | Baker | 99—94 |
| 3,248,228 | 4/1966 | Gidlow et al. | 99—93 |
| 3,551,166 | 12/1970 | Baum et al. | 99—94 |

RAYMOND N. JONES, Primary Examiner